(12) United States Patent
Sullivan et al.

(10) Patent No.: US 8,236,181 B2
(45) Date of Patent: Aug. 7, 2012

(54) PURIFICATION OF WATER FROM COOLING TOWERS AND OTHER HEAT EXCHANGE SYSTEMS

(75) Inventors: Enid J. Sullivan, Los Alamos, NM (US); Bryan J. Carlson, Ojo Caliente, NM (US); Robert M. Wingo, Los Alamos, NM (US); Thomas W. Robison, Stilwell, KS (US)

(73) Assignee: Los Alamos National Security, LLC, Los Alamos, NM (US)

( * ) Notice: Subject to any disclaimer, the term of this patent is extended or adjusted under 35 U.S.C. 154(b) by 339 days.

(21) Appl. No.: 12/772,672

(22) Filed: May 3, 2010

(65) Prior Publication Data
US 2010/0288699 A1    Nov. 18, 2010

Related U.S. Application Data

(60) Provisional application No. 61/178,405, filed on May 14, 2009.

(51) Int. Cl.
*B01D 15/00* (2006.01)
*B01D 21/00* (2006.01)
*B01D 21/01* (2006.01)
*B01J 39/00* (2006.01)
*C02F 1/42* (2006.01)
*C02F 1/00* (2006.01)
*C02F 1/52* (2006.01)
*C02F 1/68* (2006.01)
*G21F 9/04* (2006.01)
*B03D 3/06* (2006.01)
*B03D 3/00* (2006.01)

(52) U.S. Cl. ........ 210/668; 210/660; 210/681; 210/683; 210/696; 210/714; 210/724; 210/749

(58) Field of Classification Search ................ 210/660, 210/681, 683, 696, 668, 714, 724, 749
See application file for complete search history.

(56) References Cited

U.S. PATENT DOCUMENTS

| | | | |
|---|---|---|---|
| 1,860,781 A * | 5/1932 | Liebknecht | 210/670 |
| 4,276,180 A * | 6/1981 | Matson | 210/683 |
| 5,512,181 A * | 4/1996 | Matchett | 210/644 |
| 6,416,672 B1 | 7/2002 | Midkiff | |

OTHER PUBLICATIONS

Alexander et al., "The Solubility of Amorphous Silica in Water", J. Am. Chem. Soc., 75, 5655, Jun. 1954, pp. 453-455.
Greenberg et al., "The PolyMerization of Silicic Acid", J. Phys. Chem, vol. 59, May 1955, pp. 435-440.
Tanakaa et al., "Silicate Species in High pH Solution Molybdate, Whose Silica Concentration is Determined by Colorimetry", Analytica Chimica Acta, 429, Feb. 2001, pp. 117-123.
Amjad et al, "Laboratory Evaluation of Process Variables Impacting the Performance of Silica Control Agents in Industrial Water Treatment Programs", AWT, Nov. 2008, pp. 1-20.

(Continued)

*Primary Examiner* — Christopher Upton
*Assistant Examiner* — Nader Hossaini
(74) *Attorney, Agent, or Firm* — Samuel L. Borkowsky (57) ABSTRACT

The amount of silica in cooling tower water is reduced by passing cooling tower water through a column of silica gel.

10 Claims, 11 Drawing Sheets

OTHER PUBLICATIONS

Amjad et al., "An Evaluation of Silica Scale Control Additives for Industrial Water Systems", NACE Corrosion Conference & Expo 2008, Paper No. 08368, pp. 1-12.

Stumm et al., "Formation of Polysilicates as Determined by Coagulation Effects", Current Research, vol. 1, No. 3, Mar. 1967, pp. 221-227.

Conrad et al., "Modeling the Kinetics of Silica Nanocolloid Formation and Precipitation in Geologically Relevant Aqueous Solutions" Geochimica, 71, No. 3, Feb. 2007, pp. 531-542.

Icopini et al., "Kinetics of Silica Oligomerization and Nanocolloid Formation as a Function of pH and Ionic Strength at 25oC", Geochimica, vol. 69, No. 2, Jan. 2005, pp. 293-303.

Bremere et al., "Prevention of Silica Scale in Membrane Systems: Removal of Monomer and Polymer Silica", Desalination, vol. 132, Dec. 2000, pp. 89-100.

Sugita et al., "Silica Removal Performance of Seed From Geothermal Fluids", Geothermics, vol. 32, Apr. 2003, pp. 171-185.

* cited by examiner

PURIFICATION OF WATER FROM COOLING TOWERS AND OTHER HEAT EXCHANGE SYSTEMS

RELATED APPLICATIONS

This application claims the benefit of U.S. Provisional Patent Application Ser. No. 61/178,405 entitled "Purification of Water From Cooling Towers and Other Heat Exchange Systems," filed May 14, 2009, incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to wastewater purification and more particularly to reducing the amount of silica from cooling tower water.

BACKGROUND OF THE INVENTION

The Los Alamos National Laboratory ("LANL") currently uses about 1100 acre-feet per year of water in cooling towers. Approximately 50% of this water is returned to the environment as blowdown (i.e. discharged water) that contains antibacterial and antiscaling chemical additives as well as concentrated natural solutes. Chemical costs are about $10/1000 gallons. An NPDES permit is required for discharge of the water from these towers.

Cooling towers at LANL use potable water from a regional aquifer that contains between 60 to 100 mg/L of silicon-containing species that include silicic acid, silicates, polysilicic acid species, and other silicon containing species that have been expressed collectively as silica. Because the solubility of silica is approximately 160 mg/L, cooling towers must operate at less than 2 cycles of concentration ("COC"). With antiscaling additives, the towers can be operated up to about 2.5 cycles of concentration (<200 mg/L). Removal of silica from cooling tower makeup water or in situ concentrated cooling tower water would increase the potential COC, and thus reduce the need for makeup water and blowdown discharge. Considerable cost savings would be realized if even a fraction of the existing silica could be removed.

Theoretical calculations by Midkiff in U.S. Pat. No. 6,416,672 indicate that a treatment system containing glass beads would be successful in removing both dissolved and colloidal silica from cooling tower water if a sufficient quantity of small glass beads were used to overwhelm the surface area of the system by a factor of 100 or more. If it worked well, treatment using glass beads according to Midkiff appeared to be a solution to the LANL problem of removing silica from cooling tower water. If not, then there remains a need to reduce the amount of silica in concentrated cooling tower water and makeup water at Los Alamos National Laboratory ("LANL"), and at other places where high silica concentration cooling water is used, such as other heat exchange systems. There is also a need to control costs associated with antiscaling chemical use and discharged water ("blowdown") treatment, and to reduce the need for makeup water addition.

SUMMARY OF THE INVENTION

In accordance with the purposes of the present invention, as embodied and broadly described herein, an aspect of the invention is concerned with a method for maintaining the silica concentration in cooling tower water below saturation. The method involves passing cooling tower water through a column of silica gel, the cooling tower water comprising dissolved silica, dissolved silicic acid, and dissolved silicates, whereby silicic acid is removed from the cooling tower water, thereby reducing the amount of dissolved silica from the cooling tower water such that the silica concentration in the cooling tower water is below saturation.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The invention is concerned with reducing the amount of silica from cooling tower water such that the silica concentration in the cooling tower water is below saturation. It should be understood that when using the term "silica" it meant to include all dissolved and colloidal silicon-containing species that include, but are not limited to, silicic acid, silicates, polysilicic acid, $SiO_2$, and the like.

Midkiff's glass bead treatment (U.S. Pat. No. 6,416,672) was tested by conducting experiments using both a lab-scale cooling tower mockup as well as porous media column experiments. A variety of small glass beads ranging in size from 3 mm to <106 μm were used. Our water source was the cooling tower pool at the Los Alamos Neutron Science Center ("LANSCE"), which was concentrated cooling water with additives. We also used the makeup water source also located at LANSCE, which was unconcentrated tap water. Except for glass beads of a size less than 106 micrometers, which indicated a small reduction in the amount of silica, we found that treatment using glass beads according to Midkiff did not result in any significant removal of silica. Without wishing to be bound by any particular theory or explanation, one possible explanation for the poor performance is that the glass beads did not contain enough active surface sites for favorable silica precipitation. Alternately, the kinetics for precipitation may have been too slow compared to the residence time in the columns.

Because of the poor performance of glass beads, other means were sought for reducing the amount of silica in the cooling tower water. Diatomaceous earth was tried, but it exhibited poor flow characteristics and poor silica removal.

In an embodiment of this invention, treatment of cooling tower water with silica gel resulted a reduction in the amount of silica of between 40% and 50% of added silica from concentrated cooling tower water.

It is believed that the actual species acted upon and removed by the invention treatment is silicic acid ("$Si(OH)_4$") and mononuclear and polynuclear silicates derived from silicic acid. The effect of removing silicic acid and silicates derived from silicic acid is a shift in a chemical equilibrium amongst a variety of mononuclear and condensed polynuclear silicates. A result of this removal and equilibrium shift is the reduction in the amount of silica in the water.

It is known in the art that the aqueous chemistry of silicic acid is affected by concentration, pH, ions, and other factors. For example, Greenberg et al. in "The Polymerization of Silicic Acid," The Journal of Physical Chemistry, (1955), vol. 59, p. 435, reported a light scattering study of the formation of polysilicic acid in basic media. The basic media were prepared by mixing clean solutions of ammonium acetate and sodium metasilicate. Mechanisms of polymerization and aggregation were discussed. Silicic acid under certain pH conditions polymerizes to various polysilicic acid species, which in turn can form silica gel. Equilibria exist between silicic acid, polysilicic acid, and the gel.

In addition, Stumm et al. in "Formulation of polysilicates as determined by coagulation effects," Environmental Science and Technology, (1967), vol. 1, p. 221 provided the following information regarding silicic acid and various mononuclear and condensed silicates:

$SiO_2(s)$ (amorphous)$+2H_2O=Si(OH)_4$; log k (25° C.)=−2.7

$Si(OH)_4=SiO(OH)_3^-+H^+$; log k (25° C.)=−9.46 (silicic acid $K_1$)

$SiO(OH)_3^-=SiO_2(OH)_2^{-2}+H^+$; log k (25° C.)=−12.56 (silicic acid $K_2$)

$4 Si(OH)_4=SiO_6(OH)_6^{-2}+2 H^++4 H_2O$; log k=−12.57 (a condensed polymeric form)

Figure 1:
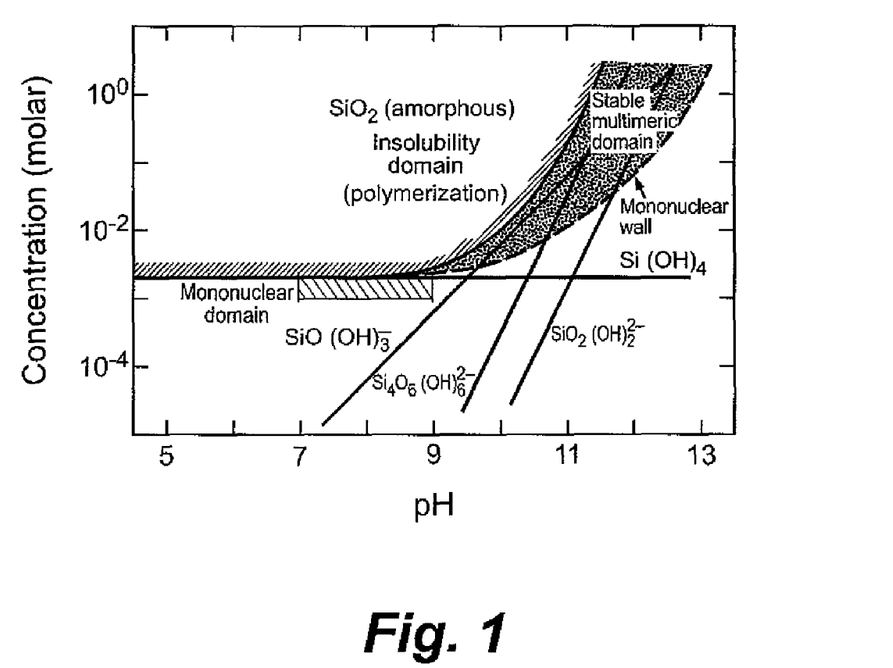
FIG. 1, adapted from Stumm and Morgan. "Aquatic Chemistry", second Edition, 1981, page 541, provides a diagram that illustrates stability domains of silica species under varying pH and concentration. The narrow dashed box from pH 7 to pH 9 indicates the range of pH and silica concentration encountered in our experiments.

FIG. 1, adapted from Stumm and Morgan, illustrates speciation that can exist at different concentrations and pH. Three domains of importance are: (1) an insolubility domain where amorphous $SiO_2$ precipitates; (2) a multimeric domain where polyanions are stable; and (3) a monomeric domain where mononuclear Si species [$Si(OH)_4$, $SiO(OH)_3^-$, and $SiO_2(OH)_2^{-2}$] are dominant. Stumm et al, ("Formulation of Polysilicates as Determined by Coagulation Effects," Environmental Science and Technology, 1967, vol. 1, p. 221), and Icopini et al. (Icopini et al., "Kinetics of Silica Oligomerization and Nanocolloid Formation as a Function of pH and Ionic Strength at 25 degrees C", Geochimica et Cosmochimica Acta, (2005), vol. 69, p. 293), both incorporated by reference herein, describe an ambient temperature process of precipitation of amorphous silica that first involves silicic acid condensing to the dimer, disilicic acid, and to oligonuclear species (trimers and tetramers). Oligomerization favors condensed Si—O—Si bonds (i.e. polysilicates) over uncondensed Si(OH) bonds. Polymerization accompanied by cyclization, crosslinking, and aggregation produces negatively charged "sols". Monomers and dimers tend to adhere preferentially to the cyclic oligomers instead of forming more linear oligomers. Oligomers tend to stabilize at a size of 2-3 nm at pH values from 2 to 7. Further aggregation eventually leads to the formation of gels.

The oligomerization is reversible with dilution or by changing the pH. For example, an increase in the pH favors condensed silicate species in solution. Alternately, at a given Si concentration, as pH is raised (e.g., from pH 9 to pH 12) the percentage of monomeric species increases as the equilibrium is shifted from is multimeric species to the (−1) or (−2) charged monomeric species. Below the polymeric boundary illustrated by the shaded lines in FIG. 2, polymeric forms are more stable. Thus, as polymerization proceeds, silica gel forms. The rate of polymerization in neutral to slightly alkaline solutions is fast (<30 minutes at $10^{-1}M<C_P<10^{-2}M$); it is slowed at very low pH levels (pH 2-3) where polymeric sols are stabilized.

The presence of neutral salts of univalent cations such as $Na^+$ appears to increase the ability of polysilicates to coagulate with negatively charged sols (Stumm et al 1967). In other words, the silica concentration required to produce coagulation decreases. This is an indication that with higher cation concentrations in solution, precipitation can occur at lower concentrations. Icopini et al. (2005) found that precipitation of $SiO_2$ was more than an order of magnitude faster in the presence of a higher ionic strength solution that included $Ca^{2+}$ and $Na^+$.

Materials used for the experiments are shown in column 1 of Table 1 shown below. Experiments using glass beads were performed to test Midkiff's theories.

TABLE 1

| Material | Experiment | Source | Additional Information |
|---|---|---|---|
| Glass Beads 3 mm | 2 | Fisher Scientific | Pretreated with nitric wash |
| Glass Beads 150-212 μm 70-100 US sieve | 3a | Sigma-Aldrich | Pretreated with nitric wash |

TABLE 1-continued

| Material | Experiment | Source | Additional Information |
|---|---|---|---|
| Glass Beads <106 μm 140 and finer US sieve | 3b | Sigma-Aldrich | No pretreatment |
| Glass Beads 425-600 μm 30-40 US sieve | 3a | Sigma-Aldrich | No pretreatment |
| Silica Gel 70 mesh | 3b, 4, 5a, 5b, 6, 7, 8 | Sigma-Aldrich | 40 Å pore size No pretreatment |
| Celite 545 diatomite | 9 | Celite Corp. | Diatomaceous earth No pretreatment |
| Bear River Zeolite | 6 | Bear River Corp, Montana | Clinoptilolite No pretreatment or washing |

Water samples were analyzed for silicon. The analytical method is equally sensitive to silicon in any dissolved form. A PERKIN ELMER OPTIMA 4500 ICP-OES spectrometer, which is an inductively coupled plasma-optical emission spectrometer, was used with an autosampler. The spectrometer was allowed to warm up first, followed by performance checks including mercury alignment, axial viewing alignment using manganese, background emission correction and precision determination. Silicon was detected using a wavelength of 251.611 nm. The Si calibration standard was obtained from SPEX and the calibration verification standard was from PEKIN ELMER OPTIMA nitric acid from FISHER SCIENTIFIC, and DI water from a MILLIPORE DIRECT Q system (reverse osmosis). Sample collection vials, pipette tips, syringes, dilution tubes and filters were all of plastic—no glass was allowed contact with the samples. Instrument calibration was prepared by dilution of the standard (1, 10, 100 ppm) in 2% nitric acid. The calibration was checked by running the middle standard, a blank and the calibration verification standard. A calibration check and calibration blank were run after every seventh sample. Samples were prepared as follows: a sample container was inverted once and 5 ml was transferred to a plastic tube with a pipette followed by 1 ml 20% $HNO_3$ and 4 ml DI water. The sample tube was then capped and shaken, transferred to a plastic syringe fitted with a 0.45 micron filter, and filtered.

Figure 2:
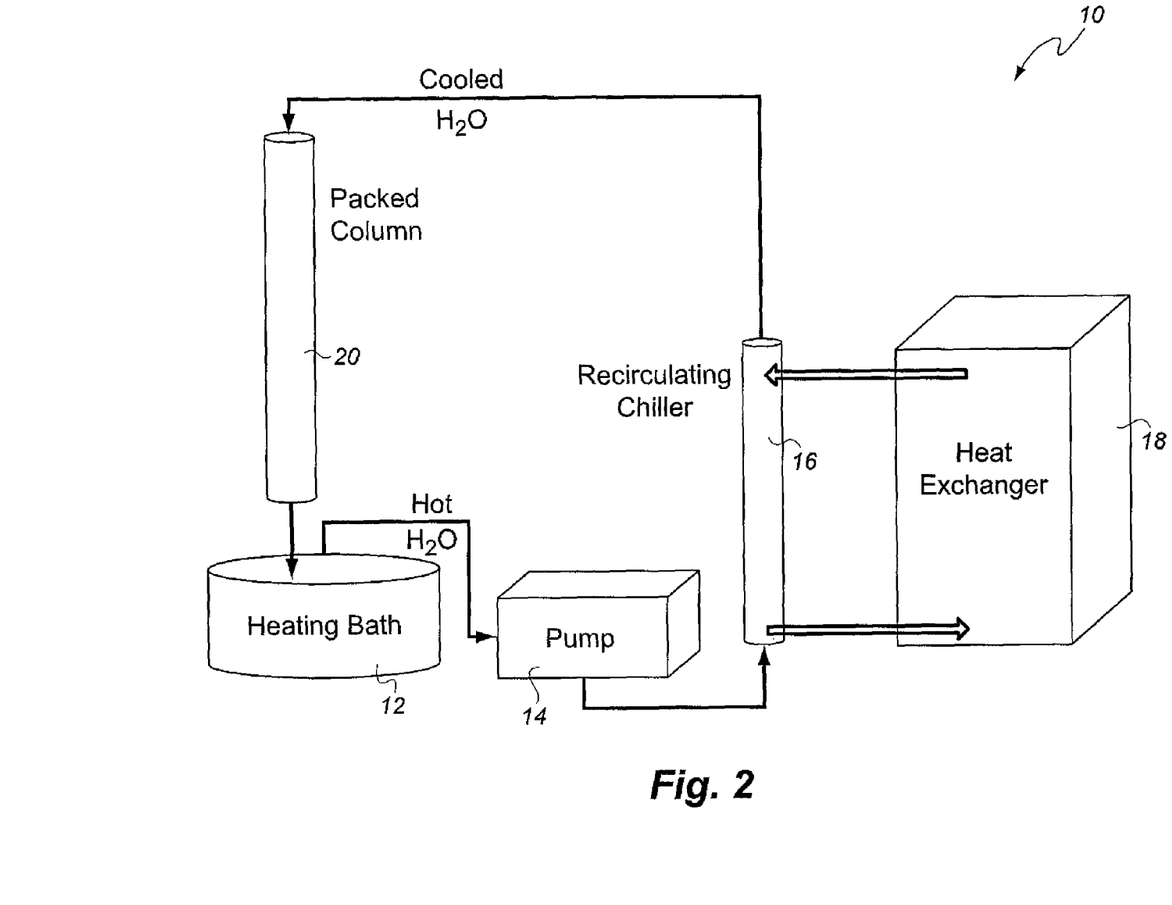
FIG. 2 shows a schematic diagram of column studies with heating bath and chiller in line with a packed column. Temperature was monitored in heating is bath and at chiller exit.
Figure 3:
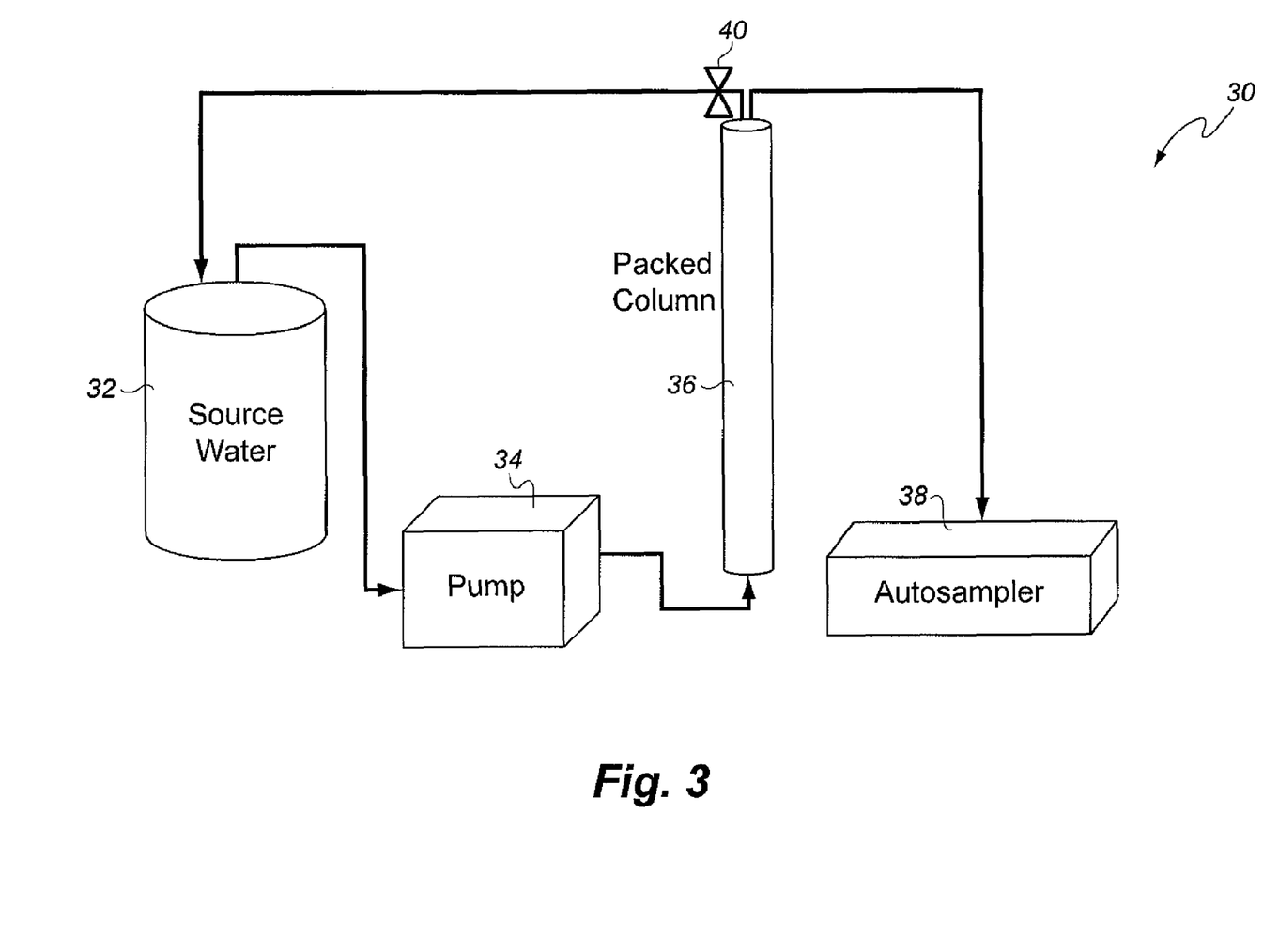
FIG. 3 shows a diagram of a simplified column setup including source water, pump, packed column, and autosampler that catches all column outflow.

Two lab-scale mock-ups of a cooling tower heating/cooling cycle apparatus that were used to demonstrate are shown in FIG. 2 and FIG. 3. The first, shown in FIG. 2, will be described now. The apparatus shown in FIG. 3 will be described later. Turning first to FIG. 2, apparatus 10 includes heating bath 12 for heating water in the apparatus. Pump 14 in communication with heating bath 10 was used to circulate water through the apparatus. Pump 14 is also in communication with recirculating chiller 16, which was used to cool water received from heating bath 12. Chiller 16 was in communication with heat exchanger 18. Heat exchanger 18 was used to remove heat from water received from chiller 16. Packed column 20 received cooled water from chiller 16. Packed column 20 was packed with a variety of materials, including glass beads, diatomaceous earth, silica gel, and the like. The Examples that follow begin with control experiments wherein the packed column 20 was removed from the apparatus. Also included are experiments with diatomaceous earth, zeolites, and experiments with silica gel. The experiments with silica gel demonstrate the invention. The experiments with the other materials besides silica gel are included for comparison.

EXAMPLE 1

Figure 4:
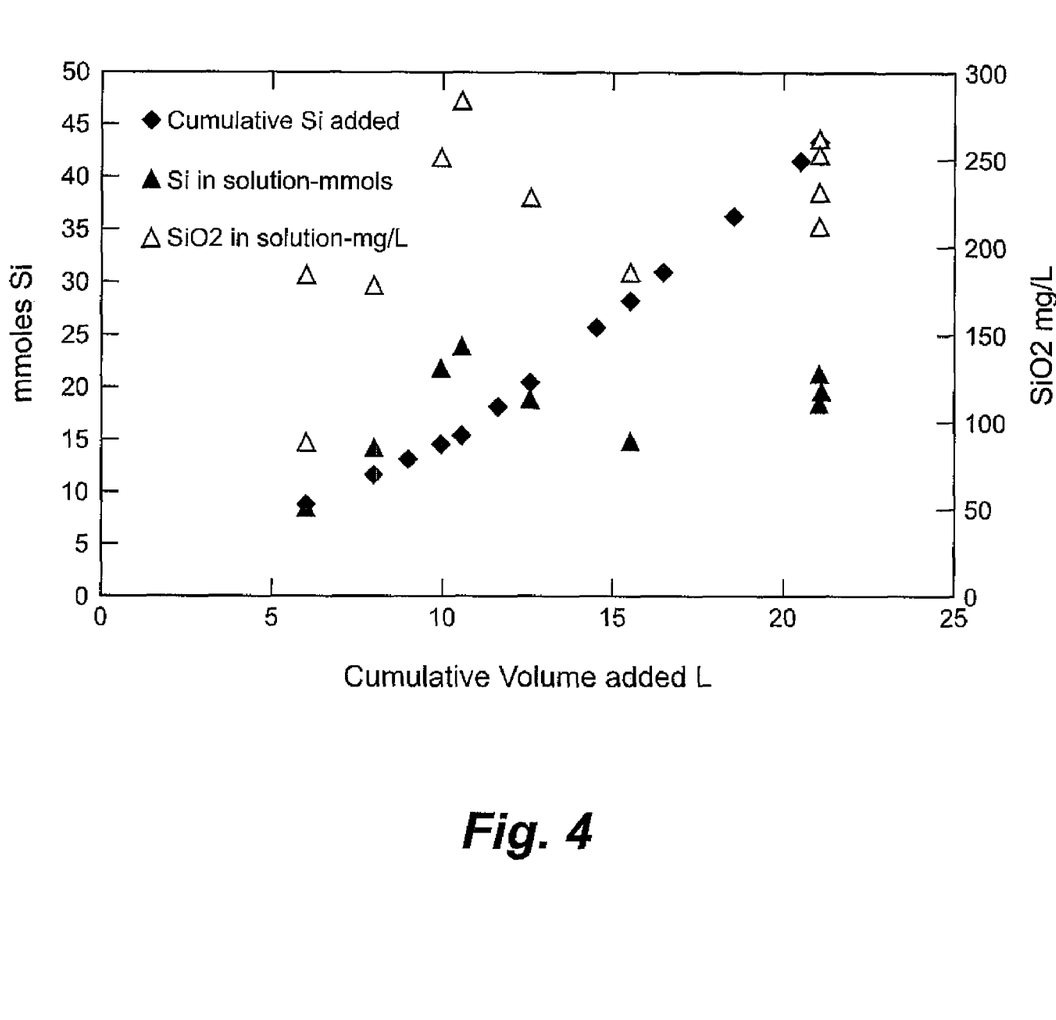
FIG. 4 shows results of experiment 1 with no column and cumulative water addition.

EXAMPLE 1 provides a control experiment wherein packed column 20 was removed from apparatus 10 and the system was run as a continuous loop with water routed from the heating bath 12, through the pump 14, and then to the chiller 16 again. Water used in EXAMPLE 1 was obtained from the LANSCE cooling tower facility pool, which is concentrated in Si and also contains additives to prevent scaling. The same water was used as makeup water as evaporation proceeded during the experimental run. Samples were removed at intervals from the outflow from the chiller. A total of 21 liters of water were added to the system. Results are shown in FIG. 4. Silica in solution versus volume of water added over time is shown along with the theoretical concentration that would occur if all added silica remained in solution. While removal of silica is noted, this is attributed to scaling, which was considerable in the tubing and heating bath by the end of the experiment. A total concentration factor of 2.5 was achieved in this experiment. Of a cumulative total of 43 mmol Si added to the system, 21.3 mmol Si remained in solution at the end.

EXAMPLE 2

EXAMPLE 2 was performed with apparatus 10 wherein column packed 20 was filled with 3 mm glass beads. Column 20, shown in FIG. 2, was positioned in between chiller 16 and the input to the heating bath 12. A goal of this EXAMPLE was to use the largest size glass beads first to determine if Si removal could occur at the surface area ratio provided by these large glass beads. The larger beads were expected to allow better flow and reduce back pressure. The column used was a 60 cm long×4.8 cm diameter glass column manufactured by KIMBLE-KONTES. It used ¹⁄₁₆ in ID inflow TEFLON tubing and TEFLON fittings. The apparatus 10 shown in FIG. 2 shows top to bottom flow through column 20. However, in this EXAMPLE, bottom to top flow was used and the column was close to saturation. For bottom to top flow, the outlet from the chiller 16 is attached to the bottom of column 20, and the outlet from column 20 is attached to heating bath 12. The column was chosen to maximize the surface area of the glass beads in relationship to the estimated surface area of the system. A ratio of 100:1 is desirable according to Midkiff, U.S. Pat. No. 6,416,672; the estimated ratio was 6:1 (the amount of 3 mm beads required to equal the estimated 100:1 estimated surface area ratio of the system would be equal to 20 kg). The same water source was used in this EXAMPLE. A total of 19.6 liters of water were added to the system.

Figure 5:
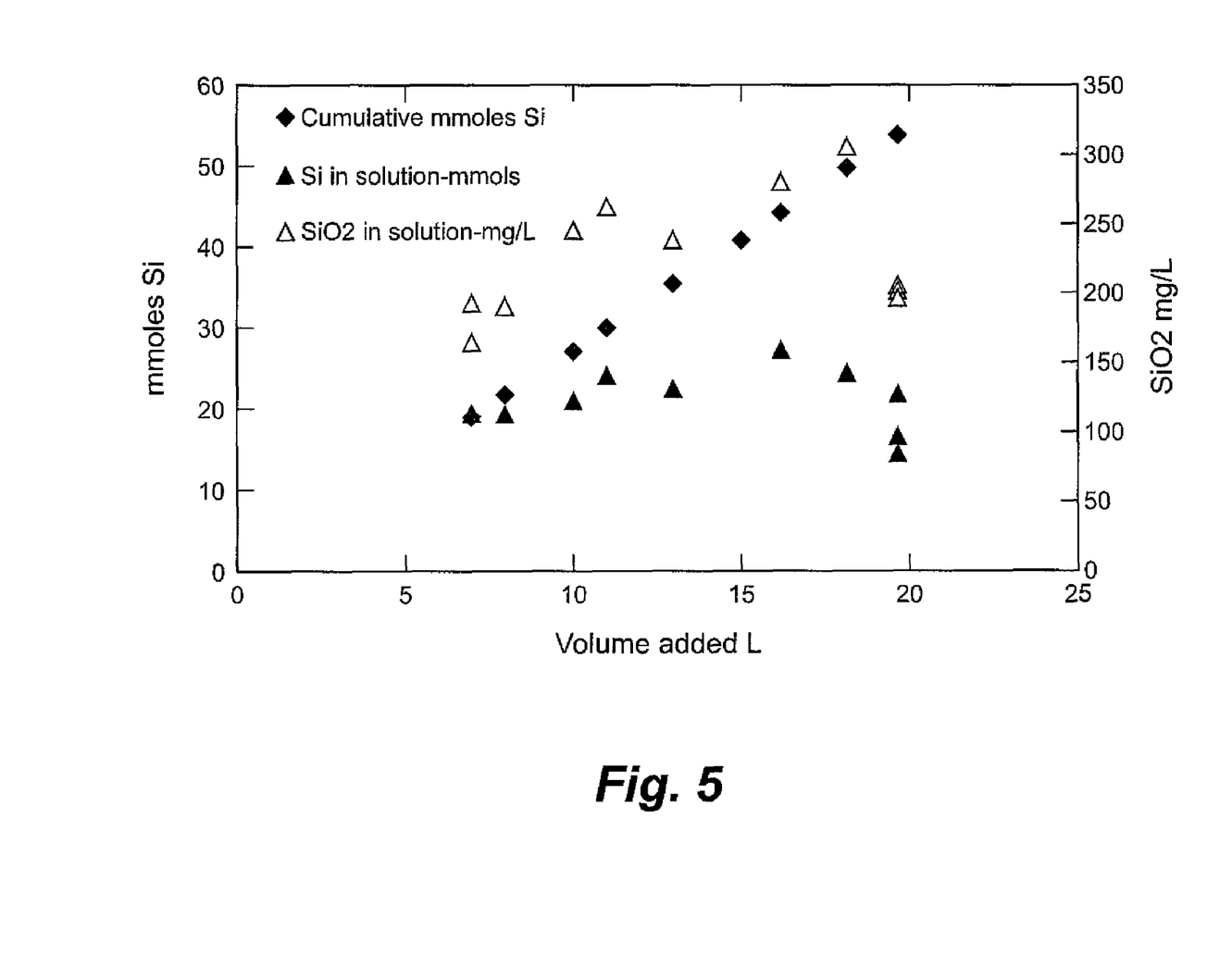
FIG. 5 shows results of experiment 2 with 3-mm bead-packed column in line.

Results from EXAMPLE 2 are shown in FIG. 5. Removal of silica was measured. Of a cumulative total of 54 mmol Si added to the system, 14.9 mmol remained in solution at the end, with 39.1 mmol removed. This indicates slightly more removal of Si than in EXAMPLE 1. The change in dry weight of the glass beads was measured and was 1.4 g/1680.3 g original weight. While this is equivalent to 23 mmol Si, it appeared that a considerable quantity of Si was again deposited in the water bath and tubing. We concluded that a simpler setup would facilitate determining the proportion of Si deposited on the glass beads versus on the rest of the system. This simpler set-up is shown in FIG. 3, which is described to in more detail in the next set of EXAMPLES.

EXAMPLE 3a-b

EXAMPLE 3 was designed to simplify the heating-cooling system apparatus and test the effectiveness of different glass bead sizes. The apparatus is shown in FIG. 3. Apparatus 30 includes, source water tank 32 and pump 34 which sends water from source water tank 32 to packed column 36. From packed column 36, water is sent to autosampler 38, which collects samples of water for analysis. Apparatus 30 also includes valve means 40 in between packed column 36 and source water tank 32. Valve means 40 is in a closed position when no recirculation of water from packed column back to source water tank is desired. Valve means 40 is in an open position when recirculation is desired. EXAMPLE 3 includes EXAMPLE 3a and EXAMPLE 3b; both used the same cooling tower water as EXAMPLES 1 and 2. In each of EXAMPLE 3a and 3b, two columns were set up. Each was run at room temperature and made of 2.85 cm ID glass and was 49.5 cm long. Column 3a-1 was packed with 425-600 μm glass beads. Column 3a-2 was packed with 150-212 μm glass beads. FIG. 3 shows a set-up with bottom to top flow in the packed column. Alternatively, top to bottom flow was also used. In this Example, the flow was top to bottom flow in order to reduce back pressure. Full saturation was not achieved for the two columns but at least ⅔ of the column material appeared to be saturated for each. Outlet flow rates varied from 6.4 to 6.8 mL/min.

Test 3b was a comparison test between silica gel and glass beads. Column 3b-1 was packed with silica gel and column 3b-2 was packed with <106 μm glass beads. Outlet flow rates varied from 2.5 to 3.5 ml/min in test 3b with similar saturation conditions noted. Each column was at room temperature.

Figure 6:
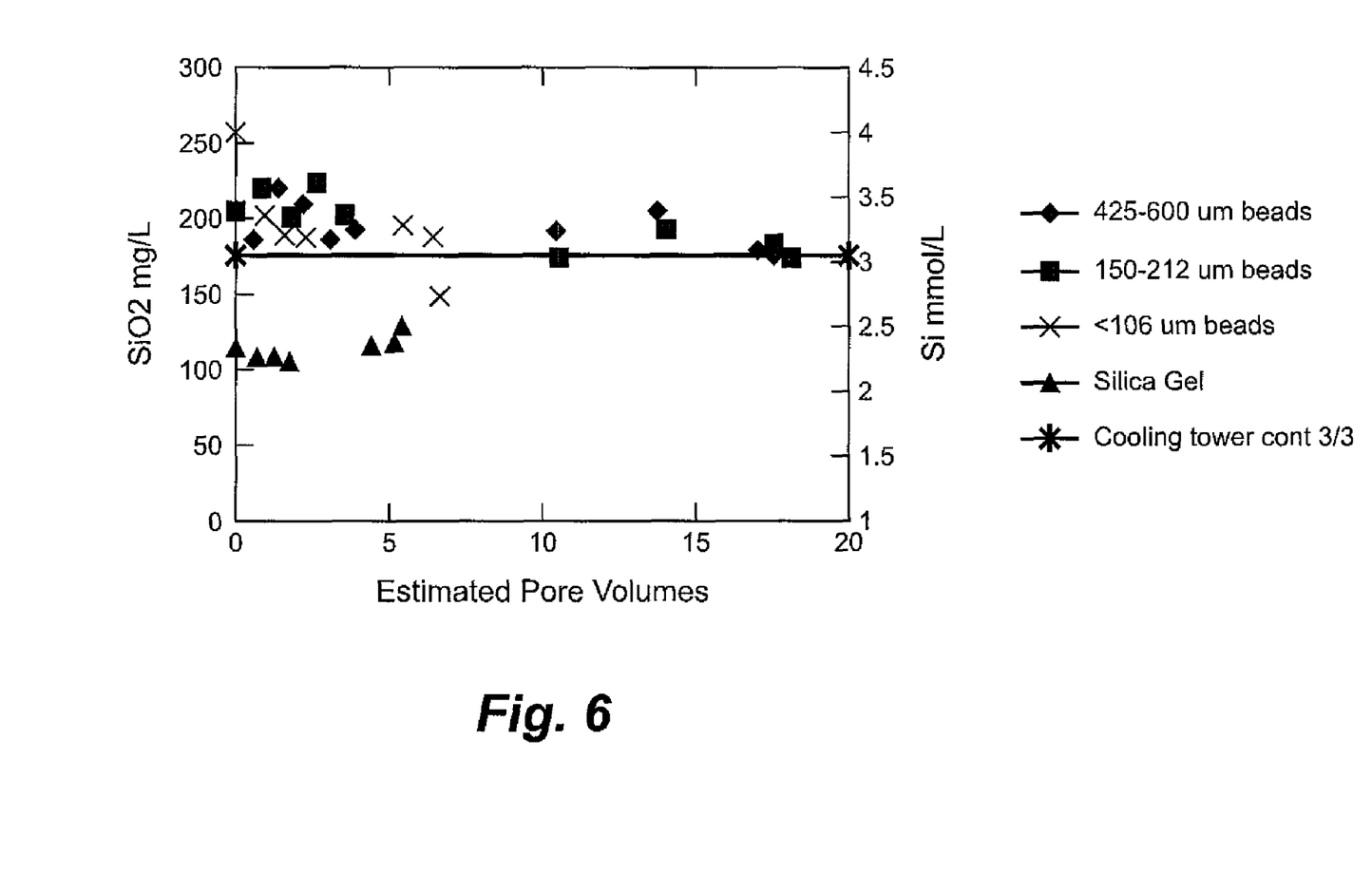
FIG. 6 shows concentration of $Si/SiO_2$ in outflow from four different packed columns. Blue line indicates original cooling tower source water concentration (177 mg/L $SiO_2$ or 2.95 mmol/L Si).

Results from EXAMPLE 3 are shown in FIG. 6, which indicates that silica gel removed approximately 40% of the original Si concentration up to about 6 pore volumes of inflow. Glass beads of various sizes showed initial increases in Si concentration after contacting the water.

EXAMPLE 4

The prior example, i.e. EXAMPLE 3, showed positive results for removal of silica from the water. EXAMPLE 4 was a further test of the positive results of the silica gel in EXAMPLE 3, using a source of water with no additives present to prevent sorption/removal of Si. In EXAMPLE 4, silica gel was packed into the glass KIMBLE-KONTES column (30 cm×4.8 cm diameter) and concentrated makeup water from the Los Alamos Neutron Science Center ("LANSCE") makeup water source was used. In this EXAMPLE, valve 40 was closed (see FIG. 3) to prevent recirculation of the water. This water was reduced by 50 percent in volume to be equivalent in Si concentration to the cooling tower water, but with no additives. Bottom to top flow, as shown in FIG. 3, was used at a flow rate of 1.6 mL/min. Some air bubbles were present in the top of the column, limiting full saturation.

Figure 7:
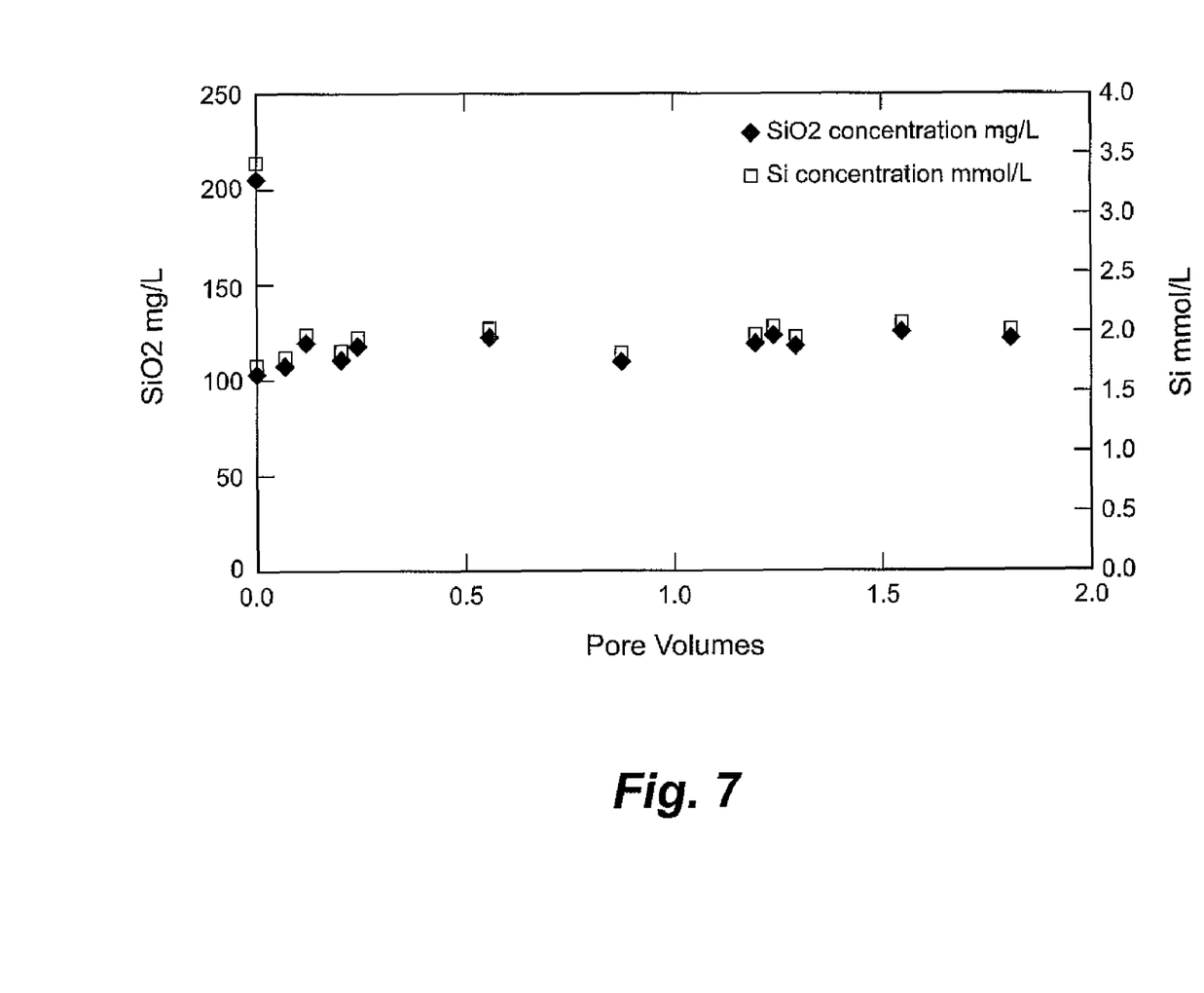
FIG. 7 shows removal of Si from concentrated makeup water using a silica gel column. Source water concentration was 206.5 mg/L $SiO_2$ or 3.44 mmol/L Si (high point on left hand axis).

Results from EXAMPLE 4 are shown in FIG. 7. This EXAMPLE verified the removal of Si by silica gel. A larger column that was fully saturated with bottom-to-top flow was used. From an initial concentration of approximately 210 mg/liter, as shown in FIG. 7, approximately 39 to 49 percent of the original concentration was removed from solution with one pass through the column.

EXAMPLE 5a-b

EXAMPLE 5a used the same column, material, flow rate, and water source as EXAMPLE 4, with a continuous recirculation (i.e. valve 40 of apparatus 3 was open to permit recirculation of the water from packed column 36 to source water tank 32) of 3010 mL of water, to determine if further reductions in Si concentration could be achieved with repeated contact with the silica gel. The source container was stirred after each sample was taken to prevent stratification.

EXAMPLE 5b used the same column, material, flow rate, and water source as EXAMPLE 5a, except that the source water pH was raised from near neutral to an initial pH of 8.8. The goal was to determine if a change in pH would change speciation and thus the percentage of sorption to the silica gel. Note that the source water already had been cycled through the column in EXAMPLES 4 and 5a.

Figure 8:
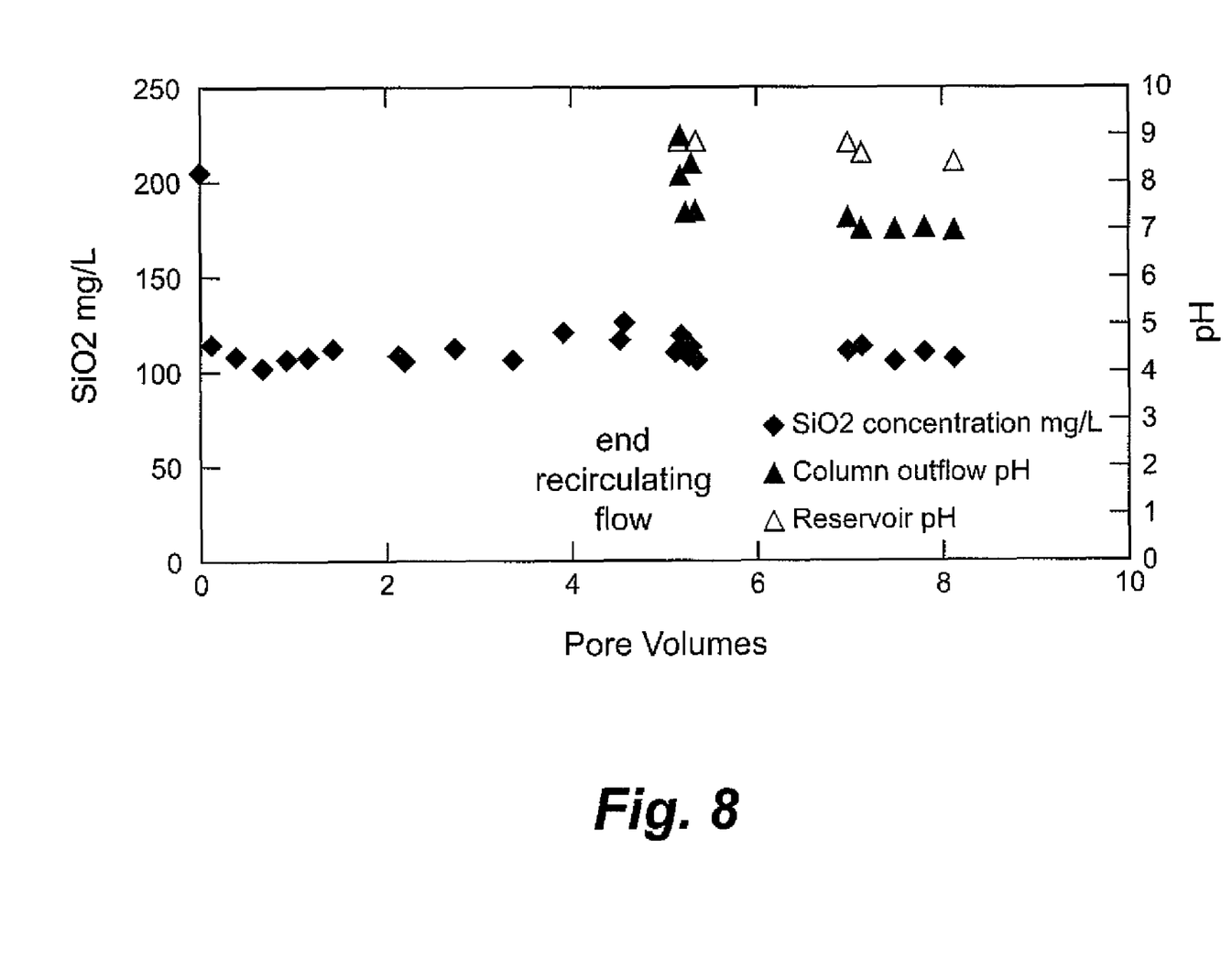
FIG. 8 shows at test of Si removal from concentrated makeup water using silica gel column and recirculating flow. A continuing test (data to the right of the arrow) using pH-adjusted source water shows no difference in pH effect on the removal. Original water concentration of Si is shown as the high point on the left hand axis.

Results from EXAMPLE 5 are shown in FIG. 8. The results of using recirculating flow with the same source water and column of experiment 4 shows that additional removal does not result from extended contact time with the silica gel. EXAMPLE 5b, which was an additional test to determine if a pH adjustment upward would improve removal (by changing speciation in the given concentration range) produced no additional Si removal for a single pass through the column.

EXAMPLE 6

EXAMPLE 6 was performed to compare silica gel with a zeolite. Apparatus 30, shown in FIG. 3, was used. A goal of this EXAMPLE was to determine if high flow and high volumes of water would saturate the column materials. Two 2.54 cm ID×30 cm long PVC columns were packed with either silica gel or Bear River Zeolite (BRZ). Cooling tower water from the LANSCE pool collected on Apr. 29, 2008 was used. Flow rates varied between 21 and 23 mL/min, from bottom to top. Water passed through the column once with no recirculation. Both the pH and the temperature of the water were measured.

Figure 9:
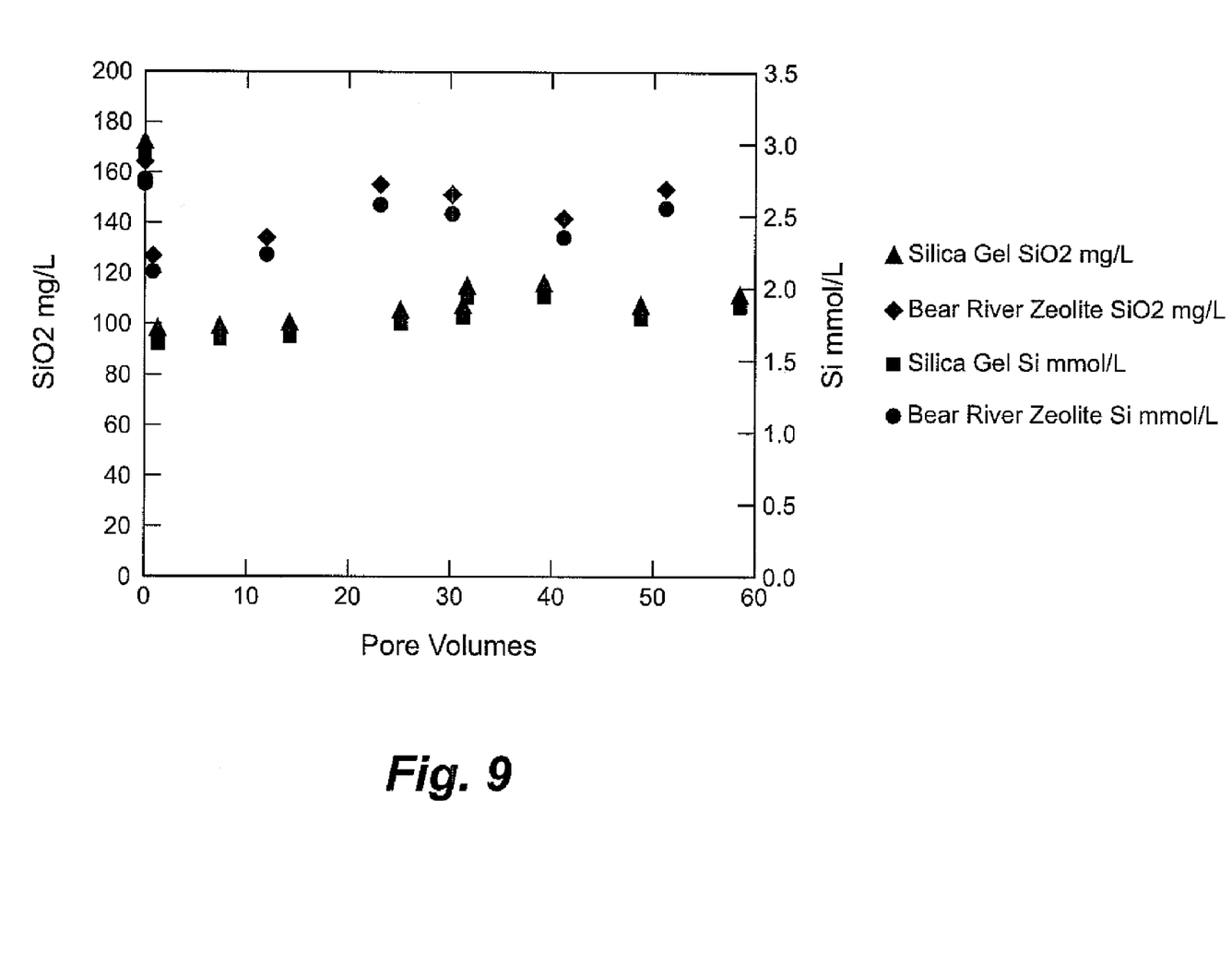
FIG. 9 shows a high-flow, long-term test of silica gel and Bear River Zeolite silica removal from cooling tower water. Original water Si concentrations are shown as high points on the left hand axis.

Results of EXAMPLE 6 are shown in FIG. 9. A higher flow, longer term experiment comparing silica gel and Bear River zeolite showed that the zeolite did reduce the amount of silica from solution (up to 25%), but was less efficient than the silica gel (up to 42%). This zeolite was not prewashed or preconditioned for this test. Both zeolite and silica gel showed reasonable flow characteristics and did not produce significant back pressures at the flow rates tested.

EXAMPLE 7

EXAMPLE 7 used the same silica gel packed column from EXAMPLES 4 and 5. Apparatus 30 was used (FIG. 3). Valve 40 was in a closed position (i.e. no recirculation). Temperature effects were examined in this EXAMPLE. In this EXAMPLE, the column of silica gel was at a temperature less than the temperature of the inlet feed water that was fed into the column. The column was wrapped with tubing and cold water was circulated through the tubing to cool the column. The water used was concentrated makeup water with no additives. Column temperatures varied from 44 to 48° C. Flow was about 1.6 mL/min. Flow was from bottom to top.

Figure 10:
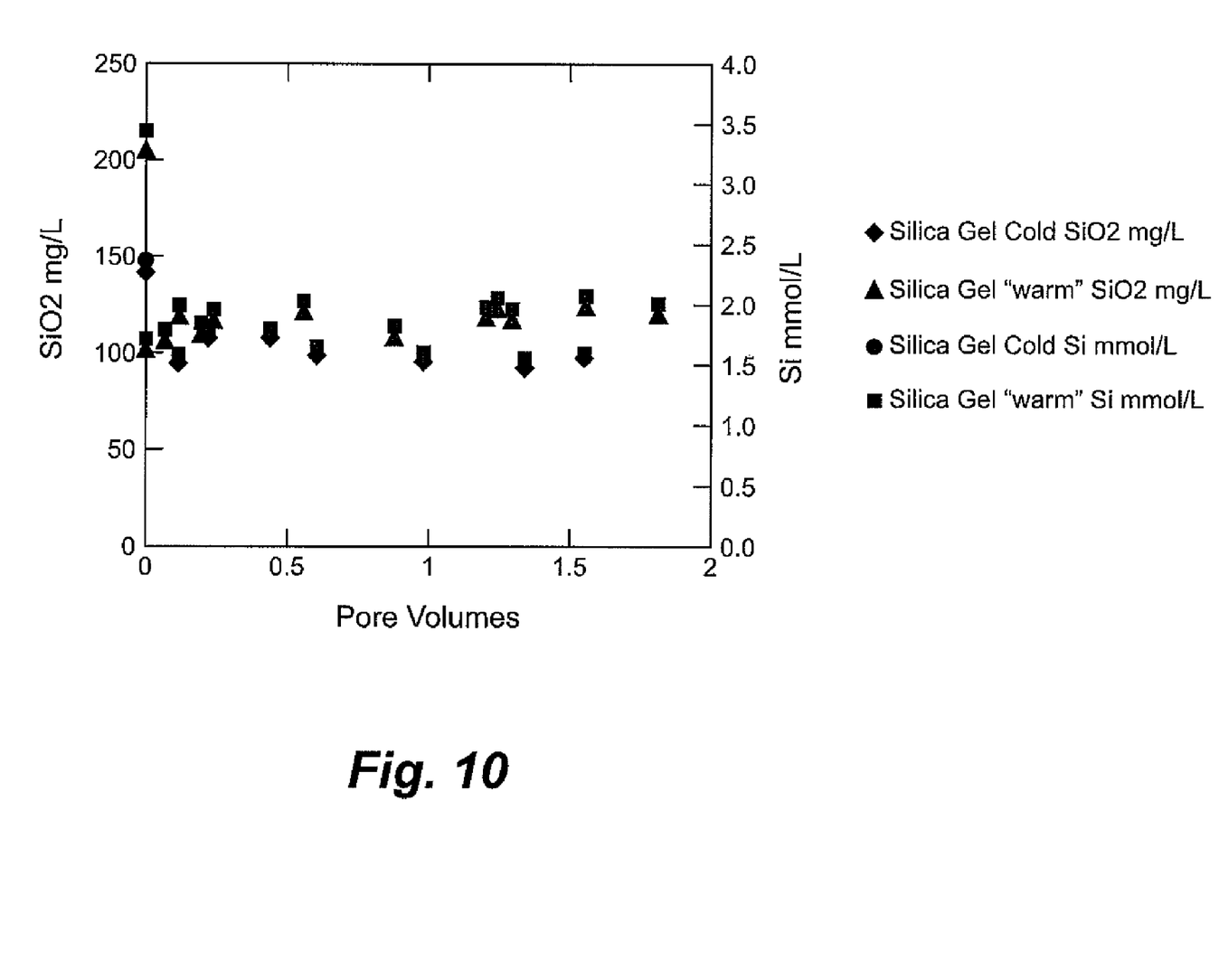
FIG. 10 shows results of cold silica gel column adsorption compared to "warm" column adsorption. Initial solution concentrations are shown on left hand axis (high points).

Results of EXAMPLE 7 are shown in FIG. 10. A column chilled to 9° C. produced final concentrations that were slightly lower than a column at room temperature (22° C.). Removal efficiency, however, was lower. Up to 35% of the original "cold" Si solution concentration was removed, versus 49% removal in the "warm" column (EXAMPLE 4). The initial "cold" concentration was lower, however, than the "warm" test (143.8 mg/L SiO$_2$ vs. 206.5 mg/L SiO$_2$) (see high points on left hand axis of FIG. 10).

EXAMPLE 8

Apparatus 30 was used in EXAMPLE 8. Valve 40 was in an open position, (i.e. recirculation). EXAMPLE 8 used the same silica gel column from EXAMPLE 6. Unconcentrated tap water (similar to unconcentrated makeup water) was circulated through the column. Bottom to top flow was used. The flow rate was approximately 36 mL/min. A goal was to examine the effect of a high flow rate. Results are provided in Table 2 below. Entries include concentration of SiO$_2$ in tap water before and after contact with silica gel in high-flow column test.

TABLE 2

| Sample (# pore volumes) | SiO$_2$ mg/L | Si (mmol/L) | Fraction Added by Dissolution |
|---|---|---|---|
| Source container | 97.58 | 1.62 | — |
| 6.3 | 116.20 | 1.93 | 0.19 |
| 11.6 | 117.06 | 1.95 | 0.20 |
| 22.4 | 121.34 | 2.02 | 0.24 |
| 43.9 | 118.13 | 1.97 | 0.21 |

An increase in outflow Si concentration was noted for all samples up to 44 pore volumes, likely indicating dissolution of the silica gel.

EXAMPLE 9

Apparatus 30 was used in EXAMPLE 9, and valve 40 was closed (i.e. no recirculation). EXAMPLE 9 was a test of diatomaceous earth (DE) as an alternative to silica gel for Si nucleation sites. CELITE 454, a commercially available example of DE, was used in this EXAMPLE. DE has a high silica content, high surface area, and may be more cost effective to use than silica gel. The same PVC column that was used in EXAMPLE 6 was now packed with 83 g of DE. Concentrated makeup water from the batch collected on May 30, 2008 was used with bottom to top flow at a flow rate of about 9 mL/min.

Figure 11:
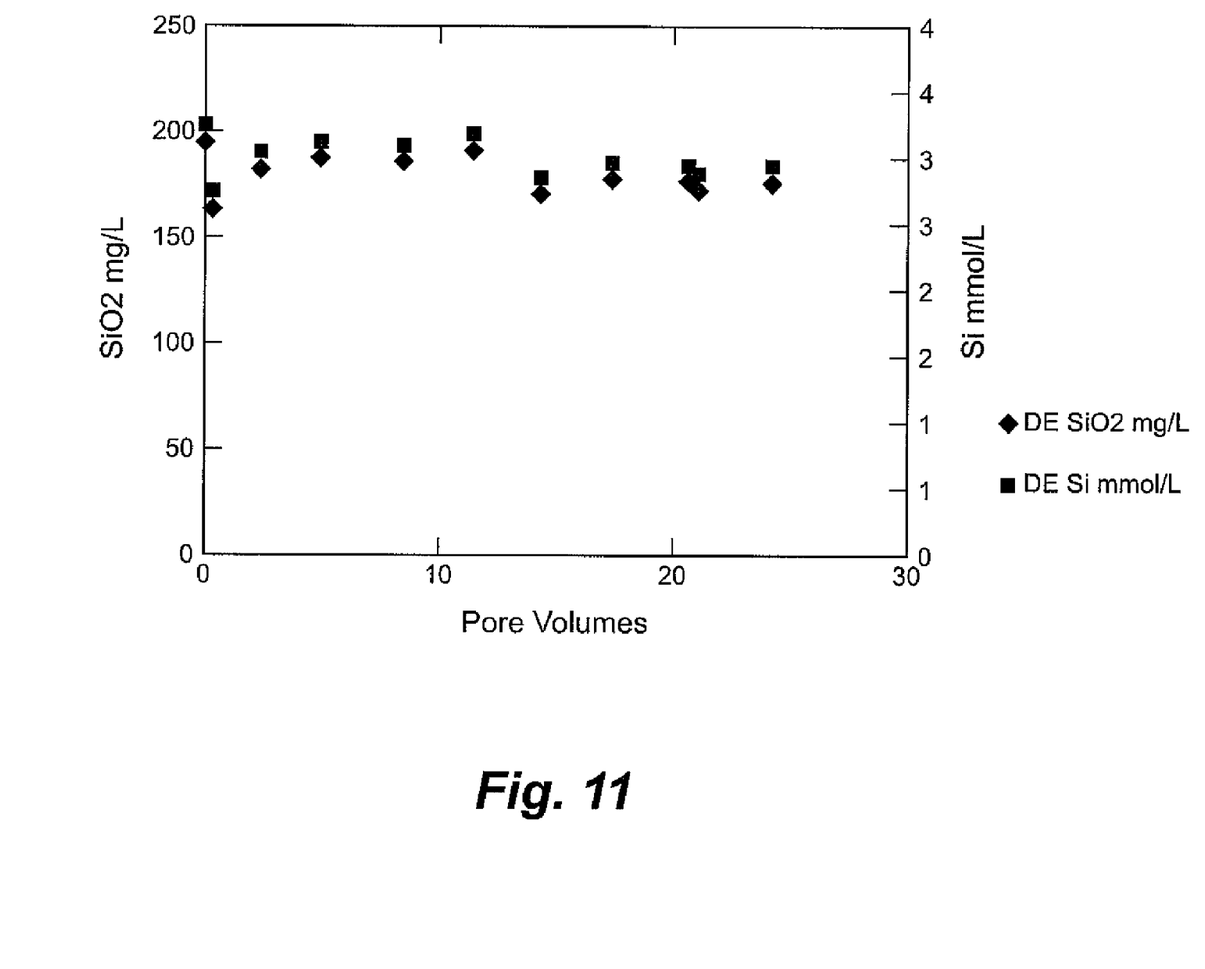
FIG. 11 shows concentration of $SiO_2/Si$ in concentrated makeup water before and after contact with Diatomaceous Earth (Celite 454) in a high-flow column test. Original concentration of source water is high point on left hand axis.

The sorption to DE was tested. Results are shown in FIG. 11. Although a slight downward shift in Si concentration was noted in the outflow water, it was mostly within the range of error of the analytical method. In addition, the material showed poorer flow characteristics than either zeolite or silica gel.

Conversion of silicic acid to condensed silicate species depends on pH, concentration, temperature, and the presence of cations in solution. Silicate species exist in equilibrium with silica gel at appropriate concentration and pH conditions. Based on speciation shown in FIG. 1, the solution concentrations that were measured tended to exist in a predominantly mononuclear domain with two different species, Si(OH)$_4$ and SiO(OH)$_3^{-1}$, coexisting in varying proportions. Data presented by Icopini et al. indicate that oligomeric species or nanoparticulates may exist at these pH ranges. Interestingly, they presented a steady-state dissolved SiO$_2$ concentration of 1.94 mmol/L after polymerization, resulting from a starting concentration of 4.2 mmol/L (SiO$_2$)$_{n \leq 3}$ at pH 7; this is almost exactly our observed result.

Because the kinetics of silica gel condensation are fast compared to condensation of silica into glass, it is likely that our results describe the condensation of monomeric silica to available silica gel surfaces, which behave like condensed cyclic oligomers. In the EXAMPLES in which glass beads were used, it is likely either they do not have enough active surface sites to participate in this equilibrium, or the kinetics for concentration are too slow for the residence time in the columns. One exception may be the <106 μm beads, which indicated a small amount of Si removal. Further, because a relatively consistent fraction of the silica was removed across several different experiments, it is likely that the species Si(OH)$_4$ is the species proportionately removed because of its participation in a direct equilibrium with silica gel. This also is indicated by the results of EXAMPLE 8, which likely did not contain a significant quantity of the adsorbing species and, thus did not exhibit any silica removal from solution.

Silicic acid removal, with the accompanying reduction in the amount of silica, appears to be most efficient at room temperature, and is fast enough that the flow rates and contact times from those rates are sufficient for removal. The variation in pH did not make a significant difference, likely because the pH adjustment was ultimately not enough to shift speciation equilibria significantly. Most of our samples varied between pH 7.0 and 9.0. Tests with stabilized polymeric Si, at pH levels of 2 or 3, as well as tests at pHs> the saturation boundary (FIG. 2), about pH level 11-12, might yield further information on the effects of speciation on the condensation reaction.

Bear River zeolite showed some removal of silica under fast flow conditions. Natural zeolites are generally inexpensive and can be prewashed to remove clays and pre-exchanged with selected cations such as Ca$^{2+}$. They also tend to have large surface areas and can be activated using acids or bases to enhance surface reactivity. Correctly prepared zeolites may show better silica removal than the raw sample used here and are easily tested. They also have superior flow characteristics to silica gel and the other fine-grained materials tested. Slower flow conditions might also improve the equilibria and, thus, silica removal, although this could reduce the effectiveness of a treatment system.

Diatomaceous earth also was tested; it tended to have poor flow characteristics and did not show a significant removal of silica. It is not known if other forms of DE or pretreatment might improve performance. Specific knowledge of the actual speciation in solution would be useful for a full description of the mechanics of the system. Although the information from Stumm et al. (1967) is descriptive it is based on controlled laboratory conditions with only Na$^+$ as a cation in solution. Some assumptions can be made about speciation with full knowledge of the pH and concentration conditions; further tests with controlled pH and initial silica concentrations may be useful for this. Possible methods for determination of speciation under different solution conditions include 29-Si NMR and FAB-MS (see: Tanakaa et al., "Silicate Species in High pH Solution Molybdate Whose Silica Concentration is Determined by Colorimetry", Analytica Chimica Acta, (2001), vol. 429, p. 117). The first method requires fairly high solution concentrations (which affect speciation). Availability of various MS methods should be assessed for this purpose.

In summary, silica gel showed good reduction, generally between 40% and 50%, in the amount of silica from concentrated cooling tower water. Diatomaceous earth, or Glass beads per Midkiff's teachings, or zeolites, did not show significant removal. A relatively consistent reduction was observed across several different experiments, which support our belief that $Si(OH)_4$ is what is being actually removed because of its equilibrium with silica gel. The method is efficient at room temperature. Removal was fast compared to contact time in the columns. We expect the method of the invention to work well from about pH 7.0 to about pH 9.5, from a pH of from about 7.5 to about 9.5, from a pH of about 8.0 to about 10.0, and more generally from a pH of from about 7.0 to about 11.0. An estimated cost of using silica gel in a larger scale treatment is $0.0001/1000 gallons.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for maintaining the silica concentration in cooling tower water below saturation, comprising:
    passing inlet feed water into a cooling tower,
    passing water from the cooling tower through a column of silica gel, the water from the cooling tower comprising dissolved silica, dissolved silicic acid, and dissolved silicates, whereby silicic acid is removed from the cooling tower water, thereby reducing the amount of silica from the cooling tower water such that the silica concentration in the cooling tower water is below saturation.

2. The method of claim 1, wherein the column of silica gel is at room temperature.

3. The method of claim 1, wherein the column of silica gel is at a temperature less than the temperature of the inlet feed water.

4. The method of claim 1, wherein the water from the cooling tower comprises a pH of from about 7.0 to about 11.0.

5. The method of claim 1, wherein the cooling tower water further comprises antiscaling additives.

6. The method of claim 1, wherein the column of silica gel is at a pH different from the pH of the inlet feed water.

7. The method of claim 1, wherein the column of silica gel is at a pH different from the pH of the water from the cooling tower.

8. The method of claim 1, wherein the water from the cooling tower comprises a pH of from about 7.0 to about 9.5.

9. The method of claim 1, wherein the water from the cooling tower comprises a pH of from about 7.5 to about 9.5.

10. The method of claim 1, wherein the water from the cooling tower comprises a pH of from about 8.0 to about 10.0.

* * * * *